Jan. 23, 1962     R. A. FINDLAY     3,017,752
DESALTING SEA WATER
Filed Aug. 28, 1959
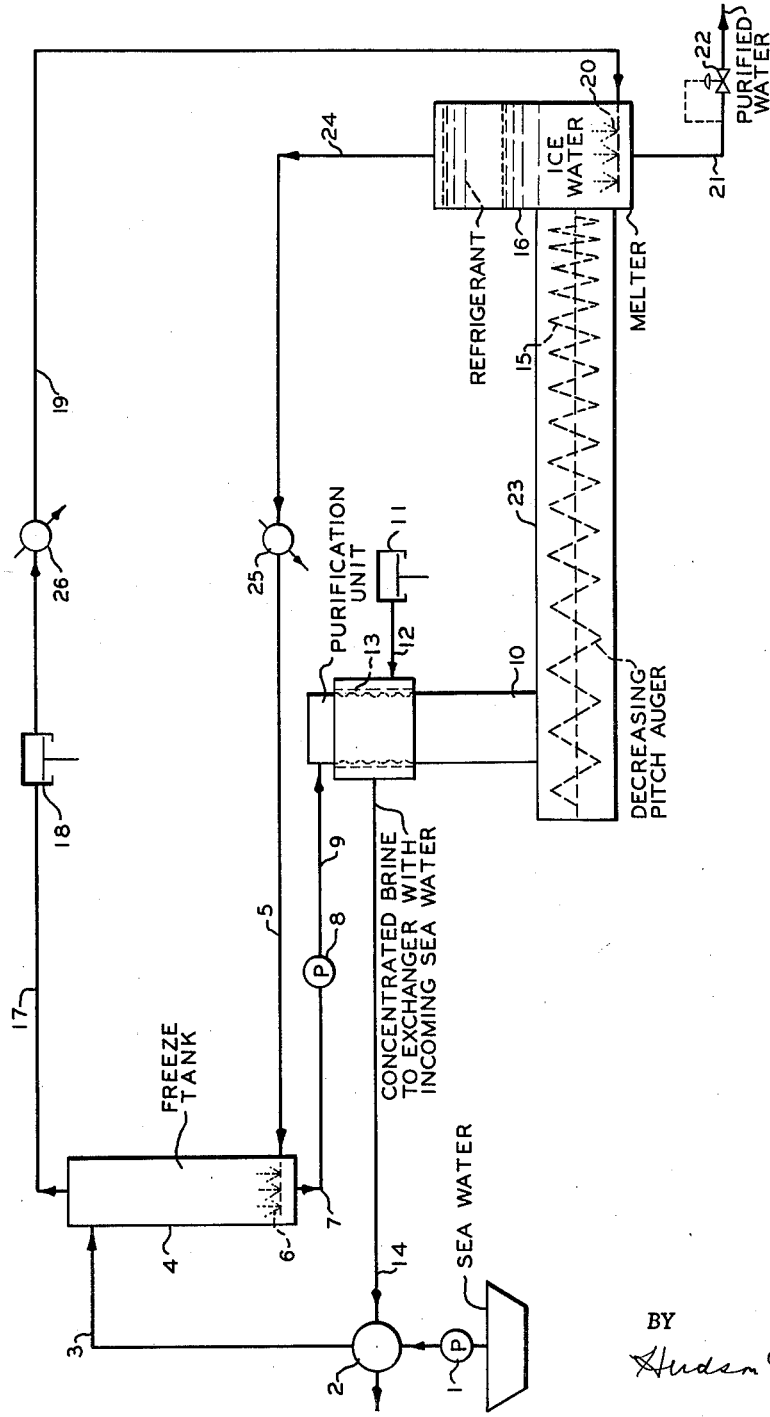
INVENTOR.
R.A. FINDLAY
BY
*Hudson & Young*
ATTORNEYS

# United States Patent Office 3,017,752
Patented Jan. 23, 1962

3,017,752
DESALTING SEA WATER
Robert A. Findlay, Bartlesville, Okla., assignor to Phillips Petroleum Company, a corporation of Delaware
Filed Aug. 28, 1959, Ser. No. 836,739
6 Claims. (Cl. 62—58)

This invention relates to the desalting of sea water. In one of its aspects, the invention relates to a unitary operation in which a refrigerant is vaporized into sea water causing the formation of ice crystals therein, a slurry thus obtained is purified in a fractional crystallization operation, crystals are fed from said operation into a melting zone wherein vapors formed when using the refrigerant as described are used to melt crystals to obtain water from which salt has been removed. In another of its aspects, the invention relates to an operation as described wherein the crystals are melted under a back pressure in a manner to cause water obtained from the crystals to flow countercurrent fashion through the crystals coming into the melting zone. In a further aspect of the invention, refrigerant vapors which have been used to melt ice crystals are recovered and recycled for expansion to freeze additional salt water.

Recently there has been increased activity to devise modus operandi whereby to recover substantially pure water from salt-containing water such as sea water. No really satisfactory system has yet been acceptably devised which will yield purified water on an economically sound basis. Water shortages loom on the horizon. It is, therefore, highly desirable to set forth feasible operations which will result in removal of salt from water.

I have now conceived of a unitary system for the recovery of substantially pure water from salt water such as sea water. Thus, I have conceived of a system or modus operandi in which an ice-water slurry can be obtained from sea water by passing a refrigerant therethrough, the slurry pumped into and purified in a so-called fractional crystallization operation, the purified crystals melted, preferably using vapors from the freezing operation, purified water recovered from the melted crystals, at least a portion of the purified water being caused to flow countercurrently to the flow of crystals through the purification operation and refrigerant used to melt the ice crystals being recycled for further use to freeze additional quantities of salt water.

An object of this invention is to provide a method for the recovery of purified water from salt-containing water such as sea water. Another object of the invention is to utilize principles of fractional crystallization to recover fresh water from sea water. A further object of the invention is to use repeatedly a refrigerant to alternately freeze and melt water in a water purification operation.

Other aspects, objects, and the several advantages of the invention are apparent from a study of this disclosure, the drawing, and the appended claims.

According to the invention there is provided a method for the recovery of fresh water from sea water which comprises freezing the sea water, forming ice crystals therein, passing the thus obtained slurry through a fractional crystallization purification unit, passing the thus treated crystals into a melting unit, therein melting crystals with refrigerant vapors emanating from the freezing operation, maintaining a back pressure on discharge of fresh water thus obtained from the melting unit, causing melted water to reflux crystals in the fractional crystallization purification unit, and returning refrigerant vapors used to melt the ice in the melting unit to the freezing unit for reuse therein.

Also according to the invention there is provided an apparatus comprising, in combination, a freeze tank, a fractional crystallization purification unit, and a melting unit, and means adapted to pump ice water slurry from the freezing unit to the purification unit and from the purification unit to the melting unit and means for introducing chilled refrigerant into the freezing unit, means for recovering refrigerant vapors thus formed and introducing the same into the melting unit and means for maintaining a back pressure on a provided purified water discharge on said melting unit.

Referring now to the drawing, sea water pumped by pump 1 is heat exchanged in exchanger 2 with concentrated cold brine, obtained as later described, and passed by way of pipe 3 into freeze tank 4. In freeze tank 4, the sea water is chilled by incoming refrigerant passed thereto by way of pipe 5 and discharged thereinto by way of spray 6. An ice slurry is pumped from freeze tank 4 by way of pipe 7, pump 8, and pipe 9 into purification unit 10. This unit can be a pulsating type fractional crystallization purifying unit such as described in Schmidt Reissue Patent 23,810 (1954), substantially as modified by the invention described in U.S. Patent 2,854,494 (1958). The purification unit here described is of the pulsating type and to this end there is provided, operatively connected to the unit 10, pulsator unit 11, the pulsations of which are transmitted to the unit by way of pipe 12. The mass of crystals pumped to unit 10 substantially fills the unit and passes downwardly therethrough. Mother liquor, obtained as later described, passes through filter 13 into pipe 14. Concentrated brine thus obtained is passed through pipe 14 and through heat exchanger 2 for heat exchange with incoming sea water. Crystals are taken from the bottom of unit 10 by rotating auger 15 and passed into melter tank 16. Vapors from freeze tank 4 pass by way of pipe 17, compressor 18, and pipe 19 into ice-containing water in melter 16. A spray 20 is provided in melter 16 for disseminating the refrigerant vapors throughout the ice-containing water in the melter. The vapors are warm enough to cause melting of the ice in the water. A back pressure is maintained on outlet 21 by means of back pressure valve 22 and this pressure causes melted ice or purified water to flow countercurrently from melter 16 through auger 15 into unit 10 wherein it freezes in contact with colder crystals causing the most impure crystals to melt. Pure water is removed by way of pipe 21 and valve 22 while refrigerant is collected at the top of melter 16 and returned by way of pipe 24 and pipe 5 to freeze tank 4. If desired, chiller 25 can be used to adjust the temperature of the returning refrigerant. Theoretically, chiller 25 and water cooler 26 are not necessary. In actual practice, because of heat leaks into the system and compressor inefficiency, some means are usually necessary to reject heat from the system.

In lieu of providing pulsating unit 11, as shown and described, reliance can be had upon the auger 15 to shear off ice crystals at the foot of column 10 and to convey these to melter 16. Also, if desired, a pulsating unit such as unit 11 can be attached elsewhere to the system. For example, such a unit as unit 11 can be attached to the auger container 23.

It will be noted that in its preferred form, the invention uses a pulse flow of pure water which melts the impure ice crystals by refreezing itself. Thus, by actual material exchange, any salt inclusions or pockets of salt within crystal clusters are eliminated. This, as is evident from a consideration of this disclosure and the patents above mentioned, is accomplished through melting of impure crystals and new pure ones being formed by freezing.

I have found that this refreezing mechanism results in very high recovery of purified water. For example, the pure water obtained from pipe 21 is equal in weight to the amount of ice crystals formed in freeze tank 4 as near as can be determined by measurement. This results from the fact that all the liquid reflux refreezes within the purification column 10. This high recovery constitutes one important advantage of my process as compared to other freeze concentration processes in which there is an appreciable loss of final product as wash water.

The refrigerant which can be used can vary. Propane is a now preferred refrigerant. Other compressible gases can be used. An example of another compressible gas which can be used is butane (also isobutane). Non-hydrocarbon gases can also be used, it being essential only that the gas be substantially immiscible with or readily recoverable from the purified water.

In the following are given operating conditions and ranges of operating conditions which will enable one skilled in the art in possession of this disclosure more rapidly to place into operation the claimed invention thereof.

*Incoming brine—Line 3*

| | | Range |
|---|---|---|
| Temperature, 50° F | | 40°–80° F. |
| Pressure, 65 p.s.i.a | | 65–75 p.s.i.a. |
| Flow rate, 100 lbs. hr | | 100–1000 lbs./hr. |

*Freeze tank—$C_3$ refrigerant*

| | |
|---|---|
| Temperature | 27.5° F. |
| Pressure, 65 p.s.i.a | Range 65–75 p.s.i.a. |
| Brine, frozen, percent | 10–12. |
| Temperature of chilled refrigerant | 32° F. |

*Pressure to which vaporized refrigerant is compressed*

| | |
|---|---|
| 75 p.s.i.a | Range 70–80 p.s.i.a. |
| Crystallizer feed temperature | 25.5° F. |
| Crystallizer bottoms | 32° F. |
| Flow into crystallizer | 100 lbs./hr.—12% ice. |
| Mother liquor out | 88 lbs./hr. |
| Pure water out | 12 lbs./hr. |

Pressure in the crystallizer oscillating with pulse from 14.7 to 100 p.s.i.g.

Reasonable variation and modification are possible within the scope of the foregoing disclosure, the drawing, and the appended claims to the invention the essence of which is that salt can be removed from salt water by chilling the same to form crystals of ice therein, passing the ice crystals through a fractional crystallization purification operation and then melting crystals thus formed using, preferably, vapors formed from the refrigerant used to form the ice crystals in the first place, maintaining a back pressure on pure water removed from a melting zone, thus causing pure water to reflux the fractional crystallization operation. Cyclic use of refrigerant as herein described is considered an important advantageous feature of the invention.

I claim:

1. A method for the purification of salt water which comprises injecting a refrigerant into a body of salt water, chilling said salt water by evaporation of said refrigerant therein, recovering refrigerant vapors thus formed, passing an ice-containing slurry thus obtained to a fractional crystallization operation, therein purifying ice crystals to reduce the salt content thereof, passing purified ice crystals thus obtained to a melting zone, therein heat exchanging ice crystals and said refrigerant vapors, forming purified water, maintaining a pressure in said melting zone sufficient to cause purified water to flow counter-current to the ice crystals in said fractional crystallization operation, and removing purified water from said melting zone as a product of the process.

2. A method according to claim 1 wherein the refrigerant is recovered from the melting zone and returned for reuse in chilling additional salt water.

3. An apparatus for the purification of salt water which comprises a freeze tank, means for evaporating a refrigerant through a body of salt water contained in said tank, means for recovering vapors of the refrigerant from said tank, a fractional crystallization purification unit, means for passing ice crystals containing salt water from said freeze tank to said fractional crystallization purification unit, an ice melting unit, means for passing recovered refrigerant vapors from said freeze tank to the melting unit, means for returning refrigerant vapors from said melting unit to said freeze tank for reuse therein, means for withdrawing purified water from said melting unit, and means on said means for withdrawing purified water from said melting unit to maintain a back pressure on said melting unit thus to cause melted water to flow counter-currently to the ice cystals in said fractional crystallization purification unit.

4. An apparatus according to claim 3 wherein the fractional crystallization purification unit is equipped with a pulsating unit.

5. An apparatus according to claim 3 wherein there is provided a feed auger for shearing ice crystals from said purification unit and conveying the same to said melting unit.

6. A method for the recovery of fresh water from salt water which comprises injecting a refrigerant into a body of salt water, chilling said salt water by evaporation of said refrigerant therein, thus forming a slurry of ice in brine, recovering refrigerant vapors thus formed, passing the slurry of ice and brine to a purification operation, therein purifying the ice crystals to reduce the salt content thereof, passing the thus obtains purified ice crystals to a melting zone, therein melting crystals by contact with the refrigerant vapors emanating from the chilling operation to form purified water, passing a portion of said purified water countercurrent to the flow of ice crystals in said purification operation and removing purified water from said melting zone as a product of the process.

References Cited in the file of this patent

UNITED STATES PATENTS

| 2,617,274 | Schmidt | Nov. 11, 1952 |
| 2,683,178 | Findlay | July 6, 1954 |
| 2,821,304 | Zarchin | Jan. 28, 1958 |
| 2,854,494 | Thomas | Sept. 30, 1958 |

UNITED STATES PATENT OFFICE
CERTIFICATE OF CORRECTION

Patent No. 3,017,752 January 23, 1962

Robert A. Findlay

It is hereby certified that error appears in the above numbered patent requiring correction and that the said Letters Patent should read as corrected below.

Column 4, line 46, for "obtains" read -- obtained --.

Signed and sealed this 5th day of June 1962.

(SEAL)
Attest:

ERNEST W. SWIDER
Attesting Officer

DAVID L. LADD
Commissioner of Patent

Notice of Adverse Decision in Interference

In Interference No. 93,237 involving Patent No. 3,017,752, R. A. Findlay, DESALTING SEA WATER, final judgment adverse to the patentee was rendered Oct. 8, 1963, as to claim 6.

[*Official Gazette May 18, 1965.*]